(12) United States Patent
Kim et al.

(10) Patent No.: US 11,312,874 B2
(45) Date of Patent: Apr. 26, 2022

(54) ANTIREFLECTION FILM

(71) Applicant: LG CHEM, LTD., Seoul (KR)

(72) Inventors: Boo Kyung Kim, Daejeon (KR); Yeong Rae Chang, Daejeon (KR); Jae Hoon Shim, Daejeon (KR); Jin Young Park, Daejeon (KR); Jae Pil Koo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 264 days.

(21) Appl. No.: 16/064,039

(22) PCT Filed: Mar. 9, 2017

(86) PCT No.: PCT/KR2017/002581
§ 371 (c)(1),
(2) Date: Jun. 20, 2018

(87) PCT Pub. No.: WO2017/155336
PCT Pub. Date: Sep. 14, 2017

(65) Prior Publication Data
US 2019/0004214 A1    Jan. 3, 2019

(30) Foreign Application Priority Data

Mar. 9, 2016  (KR) .................. 10-2016-0028464
Mar. 9, 2017  (KR) .................. 10-2017-0029955

(51) Int. Cl.
| | | |
|---|---|---|
| B32B 7/02 | (2019.01) | |
| C09D 7/65 | (2018.01) | |
| C09D 7/40 | (2018.01) | |
| C09D 201/00 | (2006.01) | |
| C09D 5/00 | (2006.01) | |

(52) U.S. Cl.
CPC .............. C09D 7/65 (2018.01); B32B 7/02 (2013.01); C09D 5/006 (2013.01); C09D 7/40 (2018.01); C09D 201/00 (2013.01); C09D 201/005 (2013.01)

(58) Field of Classification Search
CPC ......... B32B 7/02; B32B 7/023; C09D 201/00; C09D 201/005; C09D 5/006; C09D 7/40; C09D 7/65; C09D 7/61; C09D 7/63; G02B 1/111; G02B 1/14; G02B 1/16; G02B 1/11
See application file for complete search history.

(56) References Cited

U.S. PATENT DOCUMENTS

| | | |
|---|---|---|
| 7,829,650 B2 | 11/2010 | Kim et al. |
| 8,163,357 B2 | 4/2012 | Engardio et al. |
| 8,475,912 B2 | 7/2013 | Seong et al. |
| 8,999,625 B2 | 4/2015 | Glodde et al. |
| 2008/0131815 A1 | 6/2008 | Kim et al. |
| 2008/0138606 A1 | 6/2008 | Yoshihara et al. |
| 2009/0009863 A1* | 1/2009 | Nakamura ............. G02B 1/111 359/485.01 |
| 2013/0078440 A1 | 3/2013 | Kim et al. |
| 2014/0154486 A1 | 6/2014 | Kim et al. |
| 2016/0289407 A1 | 10/2016 | Park et al. |
| 2017/0022343 A1 | 1/2017 | Sakakibara et al. |
| 2017/0131439 A1 | 5/2017 | Kobori et al. |
| 2017/0343704 A1* | 11/2017 | Kim ....................... G02B 1/14 |
| 2018/0051148 A1* | 2/2018 | Kim ....................... C09D 5/00 |
| 2018/0088254 A1* | 3/2018 | Kim ..................... C09D 147/00 |
| 2018/0179395 A1* | 6/2018 | Seo ....................... C09D 7/40 |
| 2018/0194912 A1* | 7/2018 | Kim ..................... G02B 1/111 |
| 2018/0217297 A1* | 8/2018 | Kim ...................... C08J 7/042 |
| 2018/0223113 A1* | 8/2018 | Seo ..................... C09D 183/04 |
| 2018/0230317 A1* | 8/2018 | Seo ...................... C09D 5/006 |
| 2018/0313978 A1* | 11/2018 | Chang ................... C09D 4/00 |
| 2018/0364396 A1* | 12/2018 | Jang ...................... C09D 7/61 |
| 2019/0011602 A1* | 1/2019 | Kim ...................... C08J 7/0427 |

FOREIGN PATENT DOCUMENTS

| | | |
|---|---|---|
| CN | 103842455 A | 6/2014 |
| JP | 2002-079600 A | 3/2002 |
| JP | 2006-047504 A | 2/2006 |
| JP | 2006-063147 | * 12/2006 |
| JP | 2009-042351 A | 2/2009 |
| JP | 2010-139941 A | 6/2010 |
| JP | 2015-014735 A | 1/2015 |
| JP | 2015-196347 A | 11/2015 |
| JP | 2015-232614 A | 12/2015 |
| KR | 10-2006-0134100 A | 12/2006 |
| KR | 10-2008-0040927 A | 5/2008 |
| KR | 10-2012-0004474 A | 1/2012 |

(Continued)

OTHER PUBLICATIONS

Machine translation of jp 2006-063147, retrieved Jun. 24, 2020.*

(Continued)

Primary Examiner — Michael B Nelson
(74) Attorney, Agent, or Firm — Rothwell, Figg, Ernst & Manbeck, P.C.

(57) ABSTRACT

The present invention relates to an antireflection film including a low refractive index layer and a hard coating layer, the low refractive index layer including: a binder resin containing a crosslinked polymer of a photopolymerizable compound and a polysilsesquioxane substituted with one or more reactive functional groups; and inorganic fine particles dispersed in the binder resin, wherein a 10-point average roughness (Rz) of the shape of irregularities on the surface of the low refractive index layer is 0.05 μm to 0.2 μm.

14 Claims, No Drawings

(56) References Cited

FOREIGN PATENT DOCUMENTS

| KR | 10-1256552 B1    | 4/2013  |
|----|------------------|---------|
| KR | 10-1332227 B1    | 11/2013 |
| KR | 10-2014-0076787 A | 6/2014  |
| KR | 10-1416030 B1    | 7/2014  |
| KR | 10-2014-0140139 A | 12/2014 |
| KR | 20150060562 A    | 6/2015  |
| KR | 10-2015-0126590 A | 11/2015 |
| KR | 10-2016-0002407 A | 1/2016  |
| KR | 10-2016-0019367 A | 2/2016  |
| KR | 10-1610871 B1    | 4/2016  |

OTHER PUBLICATIONS

Search Report and Written Opinion issued for PCT Application No. PCT/KR2017/002581 dated Jun. 13, 2017, 12 pages.
"Surface Roughness Technical Drawings", pp. 1167-1168, [retrieved on Jan. 21, 2019], Retrieved from the Internet: <URL: https://vn.misumi-ec.com/pdf/tech/press/pr1167_1168.pdf>.
Extended European Search Report issued for European Patent Application No. 17763597.6, dated Jan. 30, 2019, 10 pages.
Japanese Standards Association, "Japanese Industrial Standard, Testing Methods for Optical Properties of Plastics JIS K 7105-1981", 1992, 34 pages.

\* cited by examiner

ANTIREFLECTION FILM

CROSS-REFERENCE TO RELATED APPLICATION(S)

This application is a 35 U.S.C. § 371 National Phase Entry Application from PCT/KR2017/00251, filed on Mar. 9, 2017, and designating the United States, which claims the benefit of priority from Korean Patent Application No. 10-2016-0028464 filed on Mar. 9, 2016 and Korean Patent Application No. 10-2017-0029955 filed on Mar. 9, 2017 with the Korean Intellectual Property Office, the full disclosures of which are incorporated herein by reference in their entirety.

TECHNICAL FIELD

The present invention relates to an antireflection film. More specifically, the present invention relates to an antireflection film capable of realizing scratch resistance and antifouling properties at the same time while having low reflectance and high light transmittance, and further capable of enhancing screen sharpness of a display device.

BACKGROUND ART

In general, a flat panel display device such as a PDP or a LCD is equipped with an antireflection film for minimizing the reflection of light incident from the outside.

As methods for minimizing the reflection of light, a method (anti-glare: AG coating) in which a filler such as inorganic fine particles is dispersed in a resin and coated onto a substrate film to impart irregularities, a method (antireflection: AR coating) of using interference of light by forming a plurality of layers having different refractive indexes on a substrate film, a method for mixing them, etc., exist.

Among them, in the case of the AG coating, the absolute amount of reflected light is equivalent to that of a general hard coating, but a low reflection effect can be obtained by reducing the amount of light entering the eye using light scattering through irregularities.

However, since the AG coating has poor screen sharpness due to the surface irregularities, many studies on AR coating have been recently conducted.

As for a film using the AR coating, a multi-layer structure in which a hard coating layer (high refractive index layer), a low reflective coating layer, and the like are laminated on a substrate film has been commercialized.

However, the method of forming a plurality of layers as described above has disadvantages in that as the process for forming each layer is performed separately, the interlayer adhesion force (interfacial adhesion) is weak and the scratch resistance is low.

In addition, conventionally, in order to improve the scratch resistance of the low refractive index layer included in the antireflection film, a method of adding various particles with a size of nanometers (for example, particles of silica, alumina, zeolite, etc.) had been mainly attempted.

However, when the nanometer-sized particles were used as described above, there was a limitation in simultaneously increasing the scratch resistance while lowering the reflectance of the low refractive index layer, and the antifouling property of the surface of the low refractive index layer was greatly reduced due to the particles with a size of nanometers.

Accordingly, many studies have been actively conducted to reduce the absolute reflection amount of light incident from the outside and to improve the antifouling property together with the scratch resistance, but the degree of improvement in physical properties resulting therefrom is insufficient.

DETAILED DESCRIPTION OF THE INVENTION

Technical Problem

It is one object of the present invention to provide an antireflection film capable of realizing scratch resistance and antifouling properties at the same time while having low reflectance and high light transmittance, and further capable of enhancing screen sharpness of a display device.

Technical Solution

In one embodiment of the present invention, an antireflection film including a low refractive index layer and a hard coating layer is provided, the low refractive index layer including: a binder resin containing a crosslinked polymer of a photopolymerizable compound and a polysilsesquioxane substituted with one or more reactive functional groups; and inorganic fine particles dispersed in the binder resin, wherein a 10-point average roughness (Rz) of the shape of irregularities on the surface of the low refractive index layer is 0.05 µm to 0.2 µm.

Hereinafter, the antireflection film according to specific embodiments of the present invention will be described in more detail.

In the present disclosure, the photopolymerizable compound collectively refers to a compound which causes a polymerization reaction when irradiated with light, for example, when irradiated with visible light or ultraviolet light.

Further, the (meth)acryl refers to including both acryl and methacryl.

Moreover, the (co)polymer refers to including both a co-polymer and a homo-polymer.

Furthermore, the hollow silica particles refer to silica particles derived from a silicon compound or an organosilicon compound, in which empty voids are present on the surface and/or inside of the silica particles.

According to one embodiment of the present invention, an antireflection film including a low refractive index layer and a hard coating layer may be provided, the low refractive index layer including: a binder resin containing a crosslinked polymer of a photopolymerizable compound and a polysilsesquioxane substituted with one or more reactive functional groups; and inorganic fine particles dispersed in the binder resin, wherein a 10-point average roughness (Rz) of the shape of irregularities on the surface of the low refractive index layer is 0.05 µm to 0.2 µm.

The present inventors conducted intensive studies on the antireflection film, and found through experiments that an antireflection film satisfying the above-mentioned numerical values relating to the 10-point average roughness (Rz) of the shape of irregularities on the surface of the low refractive index layer while including the low refractive index layer and the hard coating layer can achieve lower reflectance and higher light transmittance, improve alkali resistance, and at the same time ensure excellent abrasion resistance or scratch resistance, and further exhibit excellent mechanical properties while enhancing screen sharpness of a display device.

Specifically, the 10-point average roughness (Rz) of the shape of irregularities on the surface of the low refractive index layer may be 0.05 μm to 0.2 μm, 0.10 μm to 0.180 μm, or 0.127 μm to 0.141 μm.

As the 10-point average roughness (Rz) of the shape of irregularities on the surface of the low refractive index layer is 0.05 μm to 0.2 μm, the antireflection film can derive an optimal surface irregularity structure capable of simultaneously realizing the antireflection effect and the visibility.

The surface roughness of the antireflection film is represented by the 10-point average roughness (Rz) of the surface irregularities.

The 10-point average roughness indicates the sum of an average value of absolute values of the heights of five highest profile peaks and the depths of five deepest profile valleys based on an average line within sampling lengths from the surface irregularity curve.

At this time, when Rz, which is the 10-point height of irregularities, is 0.05 μm to 0.2 μm, 0.10 μm to 0.180 μm, or 0.127 μm to 0.141 μm, the antireflection effect and visibility can be realized at the same time.

When the 10-point average roughness (Rz) of the shape of irregularities on the surface of the low refractive index layer is less than 0.05 μm, it may cause a decrease in the antireflection effect and a hiding power of panel defects. When the 10-point average roughness (Rz) of the shape of irregularities on the surface of the low refractive index layer is greater than 0.2 μm, it may cause a decrease in the resolution such a sparkling phenomenon and a decrease in the sharpness.

The 10-point average roughness (Rz) of the shape of irregularities on the surface of the low refractive index may be measured by a non-contact surface measuring instrument (3D optical profiler).

While the 10-point average roughness (Rz) of the shape of irregularities on the surface of the low refractive index layer included in the antireflection film is 0.05 μm to 0.2 μm, a total haze of the antireflection film may be 5% or less, or 1% to 5%.

Such an antireflection film can improve the hiding power of panel defects while maintaining visibility, and can realize low reflectance and high light transmittance.

Specifically, when the total haze of the antireflection film exceeds 5%, it may cause deterioration of the visibility such as a decrease in the contrast ratio.

The total haze and internal haze of the antireflection film may be 3% or less, respectively. Specifically, the total haze of the antireflection film may be 3% or less, 2% to 3%, or 2.5% to 2.75%, and the internal haze of the antireflection film may be 2.7% or less, 2% to 2.7%, or 2.30% to 2.65%.

The total haze (Ha) is defined as the sum of a surface haze (Hs) and an internal haze (Hi), and the total haze can be obtained by measuring haze of the antireflection film itself. The internal haze can be measured by coating a planarization layer on the surface of the antireflection film which has been alkali-treated. As the total haze and the internal haze value are defined, the surface haze value can be defined.

In addition, the antireflection film may have a ratio of internal haze (Hi) to total haze (Ha) of 97% or less, 96% or less, 30% to 96%, 90% to 96%, or 92.0% to 95.90%.

Generally, the higher the surface haze, the greater the effect of reducing the reflectance due to scattering. The effect of reducing the reflectance due to the low refractive index layer is further increased within the same refractive index range, and a certain degree of surface haze must be secured so that a soft visual feeling can be secured in the display device.

On the contrary, when the ratio of the internal haze (Hi) to the total haze (Ha) in the antireflection film exceeds 97%, the ratio of the surface haze (Hs) in the total haze (Ha) becomes excessively small and it is not easy for the antireflection film to ensure sufficiently low reflectance, and also the interference pattern of the antireflection film is easily exposed, so that the sharpness and visual feeling of the display device finally applied may be deteriorated.

Further, the antireflection film can realize low reflectance and high light transmittance, and specifically, the surface characteristics and the optical characteristics may not change significantly from before to after being exposed to an alkali.

Specifically, the variation in color coordinate values (b*) of the antireflection film before or after predetermined alkali treatments may be 0.7 or less, 0.05 to 0.7, 0.5 or less, 0.1 to 0.5, 0.2 to 0.45, or 0.3 to 0.42.

The variation in color coordinate values (b*) of the antireflection film from before to after the predetermined alkali treatments can be measured using an optical device before and after the alkali pretreatment in which the antireflection film is immersed for 1 second to 100 seconds in an aqueous alkaline solution (sodium hydroxide or the like) diluted to 5 to 50% with distilled water.

The antireflection film may have average reflectance of 2.5% or less, 2.0% or less, 1.6% or less, or 1.10% to 2.25% in a visible light wavelength band region of 380 nm to 780 nm.

The low refractive index layer may have a thickness of 1 nm to 200 nm, and the hard coating layer may have a thickness of 0.1 μm to 100 μm, or 1 μm to 10 μm.

The characteristics of the antireflection film depend on the characteristics and the like of the low refractive index layer including a polysilsesquioxane substituted with one or more reactive functional groups.

Specifically, the polysilsesquioxane substituted with one or more reactive functional groups can improve the mechanical properties, for example, scratch resistance, of the low refractive layer since a reactive functional group is present on the surface, and improve the appearance characteristics such as the average reflectance and the color while enhancing the alkali resistance of the low refractive index layer, unlike the case where fine particles of silica, alumina, zeolite, etc. known in the past are used.

On the other hand, the low reflective index layer may include a binder resin containing a crosslinked polymer of a photopolymerizable compound and a polysilsesquioxane substituted with one or more reactive functional groups, and inorganic fine particles dispersed in the binder resin.

On the other hand, the polysilsesquioxane may be represented by $(RSiO_{1.5})_n$ (where n is 4 to 30, or 8 to 20), and may have various structures such as a random type, a ladder type, a cage type, a partial cage type, etc.

However, in order to enhance the physical properties and quality of the low refractive index layer and the antireflection film produced from the photopolymerizable coating composition of the one embodiment, a polyhedral oligomeric silsesquioxane having a cage structure, in which one or more reactive functional groups are substituted, may be used as the polysilsesquioxane substituted with one or more reactive functional groups.

Further, more preferably, the polyhedral oligomeric silsesquioxane having a cage structure, in which one or more functional groups are substituted, may include 8 to 20 silicon atoms in a molecule.

Further, at least one silicon atom of the polyhedral oligomeric polysilsesquioxane having a cage structure may be substituted with a reactive functional group, and further, the silicon atoms in which reactive functional groups are not substituted may be substituted with the unreactive functional groups described above.

As at least one silicon atom of the polyhedral oligomeric polysilsesquioxane having a cage structure is substituted with a reactive functional group, the mechanical properties of the coating film or the binder resin formed during photopolymerization of the photopolymerizable coating composition may be enhanced. Further, as the remaining silicon atoms are substituted with unreactive functional groups, steric hindrance occurs, which significantly decreases the frequency or probability of exposure of the siloxane bond (—Si—O—) to the outside, and thus it is possible to enhance the alkali resistance of the coating film or the binder resin formed during the photopolymerization of the photopolymerizable coating composition.

The reactive functional group substituted on the polysilsesquioxane may include at least one functional group selected from the group consisting of an alcohol, an amine, a carboxylic acid, an epoxide, an imide, a (meth)acrylate, a nitrile, a norbornene, an olefin (allyl, cycloalkenyl, vinyldimethylsilyl, etc.), polyethylene glycol, a thiol, and a vinyl group, and may preferably be an epoxide or a (meth) acrylate.

More specific examples of the reactive functional group include (meth)acrylates, alkyl(meth)acrylates having 1 to 20 carbon atoms, cycloalkyl epoxides having 3 to 20 carbon atoms, and cycloalkane epoxides having 1 to 10 carbon atoms.

The alkyl(meth)acrylate means that the other part of 'alkyl' that is not bonded to (meth)acrylate is a bonding position, the cycloalkyl epoxide means that the other part of 'cycloalkyl' that is not bonded to an epoxide is a bonding position, and the alkyl cycloalkane epoxide means that the other part of 'alkyl' that is not bonded to a cycloalkane epoxide is a bonding position.

On the other hand, the polysilsesquioxane substituted with one or more reactive functional groups may further include at least one unreactive functional group selected from the group consisting of a linear or branched alkyl group having 1 to 20 carbon atoms, a cyclohexyl group having 6 to 20 carbon atoms, and an aryl group having 6 to 20 carbon atoms, in addition to the above-described reactive functional group.

As such, as the reactive functional groups and the unreactive functional groups are surface-substituted in the polysilsesquioxane, the siloxane bond (—Si—O—) in the polysilsesquioxane substituted with one or more reactive functional groups is located inside the molecule and is not exposed to the outside, thereby further enhancing the alkali resistance and the scratch resistance of the low reflective index layer and the antireflection film.

Examples of the polyhedral oligomeric silsesquioxane (POSS) having a cage structure in which at least one reactive functional group is substituted include: POSS in which at least one alcohol is substituted, such as TMP diolisobutyl POSS, cyclohexanediol isobutyl POSS, 1,2-propanediolisobutyl POSS, octa(3-hydroxy-3-methylbutyldimethylsiloxy) POSS, etc.; POSS in which at least one amine is substituted, such as aminopropylisobutyl POSS, aminopropylisooctyl POSS, aminoethylaminopropyl isobutyl POSS, N-phenylaminopropyl POSS, N-methylaminopropyl isobutyl POSS, octaammonium POSS, aminophenylcyclohexyl POSS, aminophenylisobutyl POSS, etc.; POSS in which at least one carboxylic acid is substituted, such as maleamic acid-cyclohexyl POSS, maleamic acid-isobutyl POSS, octamaleamic acid POSS, etc; POSS in which at least one epoxide is substituted, such as epoxycyclohexylisobutyl POSS, epoxycyclohexyl POSS, glycidyl POSS, glycidylethyl POSS, glycidylisobutyl POSS, glycidylisooctyl POSS, etc.; POSS in which at least one imide is substituted, such as POSS maleimide cyclohexyl, POSS maleimide isobutyl, etc.; POSS in which at least one (meth)acrylate is substituted, such as acryloisobutyl POSS, (meth)acrylisobutyl POSS, (meth)acrylate cyclohexyl POSS, (meth)acrylate isobutyl POSS, (meth)acrylate ethyl POSS, (meth)acrylethyl POSS, (meth)acrylate isooctyl POSS, (meth)acrylisooctyl POSS, (meth)acrylphenyl POSS, (meth)acryl POSS, acrylo POSS, etc.; POSS in which at least one nitrile group is substituted, such as cyanopropylisobutyl POSS, etc.; POSS in which at least one norbornene is substituted, such as norbornenylethylethyl POSS, norbornenylethylisobutyl POSS, norbornenylethyl disilanoisobutyl POSS, trisnorbornenylisobutyl POSS, etc.; POSS in which at least one vinyl group is substituted, such as allylisobutyl POSS, monovinylisobutyl POSS, octacyclohexenyldimethylsilyl POSS, octavinyldimethylsilyl POSS, octavinyl POSS, etc.; POSS in which at least one olefin is substituted, such as allylisobutyl POSS, monovinylisobutyl POSS, octacyclohexenyldimethylsilyl POSS, octavinyidimethylsilyl POSS, octavinyl POSS, etc.; POSS in which a PEG having 5 to 30 carbon atoms is substituted; or POSS in which at least one thiol group is substituted, such as mercaptopropylisobutyl POSS, mercaptopropylisooctyl POSS, etc.

The weight ratio of the portion derived from the polysilsesquioxane substituted with one or more reactive functional groups to the portion derived from the photopolymerizable compound in the binder resin may be 0.005 to 0.50, 0.005 to 0.25, or 0.015 to 0.19.

When the weight ratio of the portion derived from the polysilsesquioxane substituted with one or more reactive functional groups to the portion derived from the photopolymerizable compound in the binder resin is too small, it may be difficult to sufficiently ensure the alkali resistance and scratch resistance of the refractive index layer.

Further, when the weight ratio of the portion derived from the polysilsesquioxane substituted with one or more reactive functional groups to the portion derived from the photopolymerizable compound in the binder resin is too large, the transparency of the reflective index layer or the antireflection film may be lowered, and the scratch resistance may be rather deteriorated.

On the other hand, the photopolymerizable compound forming the binder resin may include a monomer or oligomer containing (meth)acrylate or vinyl group.

Specifically, the photopolymerizable compound may include a monomer or an oligomer containing one or more, two or more, or three or more of (meth)acrylate or vinyl groups.

Specific examples of the monomer or oligomer containing (meth)acrylate may include pentaerythritol tri(meth)acrylate, pentaerythritol tetra(meth)acrylate, dipentaerythritol penta(meth)acrylate, dipentaerythritol hexa(meth)acrylate, tripentaerythritol hepta(meth)acrylate, trilene diisocyanate, xylene diisocyanate, hexamethylene diisocyanate, trimethylolpropane tri(meth)acrylate, trimethylolpropane polyethoxy tri(meth)acrylate, trimethylolpropane trimethacrylate, ethylene glycol dimethacrylate, butanediol dimethacrylate, hexaethyl methacrylate, butyl methacrylate, or a mixture of two or more thereof, or a urethane-modified acrylate oligomer, an epoxide acrylate oligomer, an ether acrylate oligomer, a dendritic acrylate oligomer, or a mixture of two or more thereof.

Herein, the molecular weight of the oligomers is preferably 1000 to 10,000.

Specific examples of the monomer or oligomer containing a vinyl group include divinylbenzene, styrene, and paramethyl styrene.

The content of the portion derived from the photopolymerizable compound in the binder resin is not particularly limited. However, considering the mechanical properties of the finally manufactured low refractive index layer and the antireflection film, the content of the photopolymerizable compound may be 20% by weight to 80% by weight.

Further, as described above, the low refractive index layer may include a portion derived from a fluorine-based compound containing a photoreactive functional group.

As the fluorine-based compound containing the photoreactive functional group is included, the low refractive index layer and the antireflection film can have lower reflectance and improved light transmittance, and can further enhance alkali resistance and scratch resistance. Thus, the binder resin may further include a crosslinked polymer of a photopolymerizable compound, a fluorine-based compound containing a photoreactive functional group, and a polysilsesquioxane substituted with one or more reactive functional groups.

The fluorine-based compound may include or be substituted with at least one photoreactive functional group, and the photoreactive functional group refers to a functional group which can participate in a polymerization reaction by irradiation of light, for example, by irradiation of visible light or ultraviolet light.

The photoreactive functional group may include various functional groups known to be able to participate in a polymerization reaction by irradiation of light. Specific examples thereof may include a (meth)acrylate group, an epoxide group, a vinyl group, and a thiol group.

The fluorine-based compound containing the photoreactive functional group may have a fluorine content of 1 to 60% by weight.

When the content of fluorine in the fluorine-based compound containing the photoreactive functional group is too small, the fluorine component cannot be sufficiently arranged on the surface of the low reflective index, and thus it may be difficult to sufficiently secure the physical properties such as alkali resistance.

In addition, when the content of fluorine in the fluorine-based compound containing the photoreactive functional group is too large, the surface characteristics of the low reflective index layer may be decreased, or the incidence rate of defective products may be increased in the subsequent process for obtaining the final product. Meanwhile, when the low refractive index layer is formed on one surface of the hard coating layer having the antireflection function, in order to minimize the problems due to a peel-off constant voltage that may occur during a subsequent process for producing a finally applied product (e.g., a TV or a monitor) of the antireflection film, the low reflective index layer may include a fluorine-based compound containing a photoreactive functional group having a fluorine content of 1% by weight to 25% by weight.

The fluorine-based compound containing the photoreactive functional group may further include silicon or a silicon compound.

That is, the fluorine-based compound containing the photoreactive functional group may optionally contain silicon or a silicon compound therein, and specifically, the content of silicon in the fluorine-based compound containing the photoreactive functional group may be 0.1% by weight to 20% by weight.

The silicon contained in the fluorine-based compound containing the photoreactive functional group may serve to increase transparency by preventing the generation of haze in the low refractive index layer.

On the other hand, if the content of silicon in the fluorine-based compound containing the photoreactive functional group becomes too large, the alkali resistance of the low refractive index layer may be reduced.

The fluorine-based compound containing the photoreactive functional group may have a weight average molecular weight (weight average molecular weight in terms of polystyrene measured by a GPC method) of 2000 to 200,000.

If the weight average molecular weight of the fluorine-based compound containing the photoreactive functional group is too small, the low refractive index layer may not have sufficient alkali resistance characteristics.

Further, when the weight average molecular weight of the fluorine-based compound containing the photoreactive functional group is too large, the low refractive index layer may not have sufficient durability and scratch resistance, compatibility between the other components and the fluorine-based compound containing the photoreactive functional group may be lowered, and uniform dispersion does not occur during the production of the low refractive index layer, so that the internal structure and surface characteristics of the final product can be deteriorated.

Specifically, the fluorine-based compound containing the photoreactive functional group may include: i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer (for example, a polydimethylsiloxane-based polymer) in which at least one photoreactive functional group is substituted and at least one fluorine is substituted on at least one silicon; or iv) a polyether compound in which at least one photoreactive functional group is substituted and at least one hydrogen is substituted with fluorine, or a mixture of two or more of i) to iv), or a copolymer thereof.

The low reflective index layer may contain 1 to 75 parts by weight of the fluorine-based compound containing the photoreactive functional group based on 100 parts by weight of the photopolymerizable compound.

When the fluorine-based compound containing the photoreactive functional group is added in an excess amount relative to the photopolymerizable compound, the low refractive index layer may not have sufficient durability or scratch resistance.

In addition, when the amount of the fluorine-based compound containing the photoreactive functional group relative to the photopolymerizable compound is too small, the low refractive index layer may not have sufficient alkali resistance.

On the other hand, the binder resin may further include a portion derived from a fluorine-based (meth)acrylate-based compound in addition to the above-mentioned photopolymerizable compound.

The fluorine-based (meth)acrylate-based compound may also be in a state of being crosslinked with any one or more of other components contained in the binder resin.

When the fluorine-based (meth)acrylate-based compound is further included, the weight ratio of the fluorine-based (meth)acrylate-based compound to the monomer or oligomer containing a (meth)acrylate or vinyl group may be 0.1% to 10%.

Specific examples of the fluorine-based (meth)acrylate-based compound include at least one compound selected from the group consisting of the following Chemical Formulae 11 to 15.

[Chemical Formula 11]

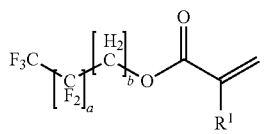

In the above Chemical Formula 11, $R^1$ is a hydrogen group or an alkyl group having 1 to 6 carbon atoms, a is an integer of 0 to 7, and b is an integer of 1 to 3.

[Chemical Formula 12]

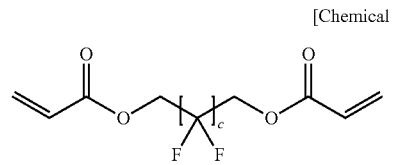

In the above Chemical Formula 12, c is an integer of 1 to 10.

[Chemical Formula 13]

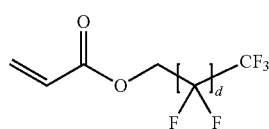

In the above Chemical Formula 13, d is an integer of 1 to 11.

[Chemical Formula 14]

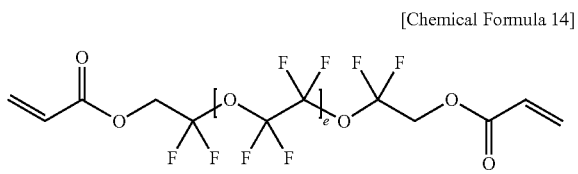

In the above Chemical Formula 14, e is an integer of 1 to 5.

[Chemical Formula 15]

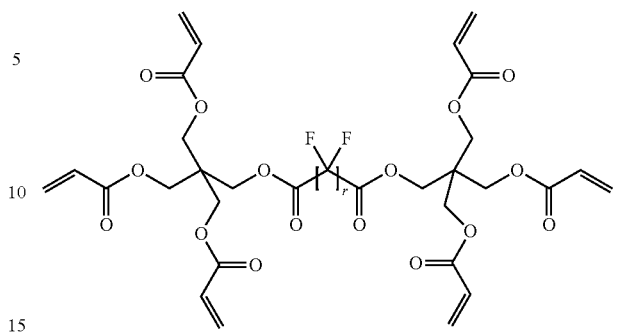

In the above Chemical Formula 15, f is an integer of 4 to 10.

On the other hand, the inorganic fine particle means an inorganic particle having a diameter of nanometer or micrometer units.

Specifically, the inorganic fine particles may include solid inorganic nanoparticles and/or hollow inorganic nanoparticles.

The solid inorganic nanoparticles mean particles having a maximum diameter of 100 nm or less, and having a form in which empty voids are not present therein.

Further, the hollow inorganic nanoparticles mean particles having an average diameter of 200 nm or less, and having a form in which empty voids are present on the surface and/or inside thereof.

The solid inorganic nanoparticles may have a diameter of 0.5 to 100 nm, or 1 to 50 nm.

The hollow inorganic nanoparticles may have a diameter of 1 to 200 nm, or 10 to 100 nm.

Meanwhile, each of the solid inorganic nanoparticles and the hollow inorganic nanoparticles may contain at least one reactive functional group selected from the group consisting of a (meth)acrylate group, an epoxide group, a vinyl group, and a thiol group on the surface thereof.

As each of the solid inorganic nanoparticles and the hollow inorganic nanoparticles contain the above-described reactive functional group on the surface, the low refractive index layer can have a higher degree of crosslinking, thereby securing more improved scratch resistance and antifouling properties.

As for the hollow inorganic nanoparticles, hollow inorganic nanoparticles whose surface is coated with a fluorine-based compound may be used either alone or in combination with hollow inorganic nanoparticles whose surface is not coated with a fluorine-based compound.

When the surface of the hollow inorganic nanoparticles is coated with a fluorine-based compound, the surface energy may be further reduced and thereby the durability and scratch resistance of the low reflective index layer may be further increased.

As a method of coating a fluorine-based compound onto the surface of the hollow inorganic nanoparticles, conventionally known particle coating methods, polymerization methods, and the like may be used without any limitation. For example, the hollow inorganic nanoparticles and the fluorine-based compound may be subjected to a sol-gel reaction in the presence of water and a catalyst, and thereby the fluorine-based compound may be bonded to the surface of the hollow inorganic nanoparticles via a hydrolysis and condensation reaction.

Specific examples of the hollow inorganic nanoparticles may include hollow silica particles.

The hollow silica may include a predetermined functional group substituted on the surface thereof to be more readily dispersed in the organic solvent.

Examples of organic functional groups which can be substituted on the surface of the hollow silica particles are not particularly limited, but for example, a (meth)acrylate group, a vinyl group, a hydroxyl group, an amine group, an allyl group, an epoxy group, a hydroxyl group, an isocyanate group, an amine group, fluorine, etc., may be substituted on the surface of the hollow silica.

The binder resin of the low refractive index layer may include 10 to 350 parts by weight, or 50 to 300 parts by weight, of the inorganic fine particles based on 100 parts by weight of the photopolymerizable compound. When the inorganic fine particles are added in an excess amount, the scratch resistance and abrasion resistance of the coating film may be deteriorated due to a decrease in the content of the binder.

Meanwhile, the low refractive index layer can be obtained by coating a photopolymerizable coating composition including a photopolymerizable compound, inorganic fine particles, and a polysilsesquioxane substituted with one or more reactive functional groups onto a predetermined substrate, and then photopolymerizing the coated product.

The specific type and thickness of the substrate are not particularly limited, and a substrate known to be used in the production of the low refractive index layer or the antireflection film can be used without particular limitation.

The photopolymerizable coating composition may further include a fluorine-based compound containing a photoreactive functional group.

The photopolymerizable coating composition may further include a photoinitiator.

As the photopolymerization initiator, any compound known to be usable in a photopolymerizable resin composition may be used without particular limitation. Specifically, a benzophenone-based compound, an acetophenone-based based compound, a nonimidazole-based compound, a triazine-based compound, an oxime-based compound, or a mixture of two or more thereof may be used.

The photopolymerization initiator may be used in an amount of 1 to 100 parts by weight based on 100 parts by weight of the photopolymerizable compound.

If the amount of the photopolymerization initiator is too small, the initiator can remain uncured in the step of photopolymerizing the photopolymerizable coating composition to generate a residual material.

If the amount of the photopolymerization initiator is too large, the unreacted initiator may remain as impurities or the crosslinking density may be lowered, and thus the mechanical properties of the resulting film may be deteriorated, or the reflectance may be greatly increased.

In addition, the photopolymerizable coating composition may further include an inorganic solvent.

Non-limiting examples of the organic solvent include ketones, alcohols, acetates, and ethers, or a mixture of two or more thereof.

Specific examples of such organic solvent include ketones such as methyl ethyl ketone, methyl isobutyl ketone, acetylacetone, or isobutyl ketone; alcohols such as methanol, ethanol, n-propanol, i-propanol, n-butanol, i-butanol, or t-butanol; acetates such as ethyl acetate, i-propyl acetate, or polyethylene glycol monomethyl ether acetate; ethers such as tetrahydrofuran or propylene glycol monomethyl ether; or a mixture of two or more thereof.

The organic solvent may be added at the time of mixing the respective components contained in the photopolymerizable coating composition, or may be added to the photopolymerizable coating composition while the respective components are added in a state of being dispersed or mixed in the organic solvent.

If the content of the organic solvent in the photopolymerizable coating composition is too small, the flowability of the photopolymerizable coating composition may be reduced, resulting in defects such as generation of stripes in the finally produced film, or the like.

Further, if the organic solvent is added in an excess amount, the solid content is lowered, and the physical properties and surface properties of the film may be deteriorated due to insufficient coating and film formation, and defects may occur during the drying and curing processes.

Accordingly, the photopolymerizable coating composition may include an organic solvent such that the concentration of the total solids of the components contained becomes 1% by weight to 50% by weight, or 2% by weight to 20% by weight.

The method and apparatus commonly used for coating the photopolymerizable coating composition can be used without particular limitation. For example, a bar coating method, such as a Meyer bar coating method or the like, a gravure coating method, a 2-roll reverse coating method, a vacuum slot die coating method, a 2-roll coating method, or the like can be used.

In the step of photopolymerizing the photopolymerizable coating composition, ultraviolet light or visible light having a wavelength of 200 nm to 400 nm can be irradiated, and the amount of exposure is preferably 100 to 4000 mJ/cm$^2$.

The exposure time is not particularly limited, and can be appropriately varied depending on the exposure apparatus used, the wavelength of the irradiated light, or the amount of exposure.

Further, in the step of photopolymerizing the photopolymerizable coating composition, nitrogen purging or the like may be performed in order to apply nitrogen atmosphere conditions.

On the other hand, as the hard coating layer, a hard coating layer conventionally known in the art be used without any particular limitation.

As one example of the hard coating film, a hard coating film including a binder resin containing a photopolymerizable resin and an organic or inorganic fine particle dispersed in the binder resin may be mentioned.

The photopolymerizable resin contained in the hard coating layer is a polymer of a photopolymerizable compound which can cause a polymerization reaction when irradiated with light such as ultraviolet rays, and may be one that is conventionally used in the art.

Specifically, the photopolymerizable resin may include: at least one selected from the group consisting of a reactive acrylate oligomer group including a urethane acrylate oligomer, an epoxide acrylate oligomer, a polyester acrylate, and a polyether acrylate; and a polyfunctional acrylate monomer group including dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylpropane ethoxy triacrylate, 1,6-hexanediol diacrylate, propoxylated glycerol triacrylate, tripropylene glycol diacrylate, and ethylene glycol diacrylate.

The particle size of the organic or inorganic fine particles is not specifically limited, but for example, the organic fine particles may have a particle diameter of 1 to 10 µm, and the inorganic particles may have a particle diameter of 1 nm to 500 nm, or 1 nm to 300 nm.

In addition, specific examples of the organic or inorganic fine particles contained in the hard coating film are not limited, but for example, the organic or inorganic fine particles may be an organic fine particle composed of an acrylic-based resin, a styrene-based resin, an epoxide resin, or a nylon resin, or an inorganic fine particle composed of silicon oxide, titanium dioxide, indium oxide, tin oxide, zirconium oxide, or zinc oxide.

The binder resin of the hard coating film may further include a high molecular weight (co)polymer having a weight average molecular weight of 10,000 or more.

The high molecular weight (co)polymer may be at least one selected from the group consisting of a cellulose-based polymer, an acrylic-based polymer, a styrene-based polymer, an epoxide-based polymer, a nylon-based polymer, a urethane-based polymer, and a polyolefin-based polymer.

The hard coating film may be formed from an anti-glare coating composition including organic or inorganic fine particles, a photopolymerizable resin, a photoinitiator, and a high molecular weight (co)polymer having a weight average molecular weight of 10,000 or more.

As another example of the hard coating film, a hard coating film including a binder resin of a photopolymerizable resin and an antistatic agent dispersed in the binder resin may be mentioned.

The photopolymerizable resin contained in the hard coating layer is a polymer of a photopolymerizable compound which can cause a polymerization reaction when irradiated with light such as ultraviolet rays, and may be one conventionally used in the art.

Preferably, however, the photopolymerizable compound may be a polyfunctional (meth)acrylate-based monomer or oligomer, wherein the number of (meth)acrylate functional groups is 2 to 10, preferably 2 to 8, and more preferably 2 to 7, which is advantageous in terms of securing the physical properties of the hard coating layer.

More preferably, the photopolymerizable compound may be at least one selected from the group consisting of pentaerythritol tri(meth)acrylate, pentaerythritol tetra(meth)acrylate, dipentaerythritol penta(meth)acrylate, dipentaerythritol hexa(meth)acrylate, dipentaerythritol hepta(meth)acrylate, tripentaerythritol hepta(meth)acrylate, trilene diisocyanate, xylene diisocyanate, hexamethylene diisocyanate, trimethylolpropane tri(meth)acrylate, and trimethylolpropane polyethoxy tri(meth)acrylate.

The antistatic agent may be a quaternary ammonium salt compound, a conductive polymer, or a mixture thereof Here, the quaternary ammonium salt compound may be a compound having at least one quaternary ammonium salt group in the molecule, and a low molecular weight form or a high molecular weight form may be used without limitation.

Further, as for the conductive polymer, a low molecular weight form or a high molecular weight form can be used without limitation, and its type is not particularly limited as long as it may be one that is conventionally used in the technical field to which the present invention belongs.

The hard coating film including a photopolymerizable resin binder resin, and an antistatic agent dispersed in the binder resin, may further include at least one compound selected from the group consisting of an alkoxysilane-based oligomer and a metal alkoxide-based oligomer.

The alkoxysilane-based compound may be one that is conventionally used in the art, but preferably includes at least one compound selected from the group consisting of tetramethoxysilane, tetraethoxysilane, tetraisopropoxysilane, methyltrimethoxysilane, methyltriethoxysilane, methacryloxypropyl trimethoxysilane, glycidoxypropyl trimethoxysilane, and glycidoxypropyl triethoxysilane.

In addition, the metal alkoxide-based oligomer can be prepared through a sol-gel reaction of a composition including a metal alkoxide-based compound and water.

The sol-gel reaction can be carried out by a method similar to the method for producing an alkoxysilane-based oligomer described above.

However, since the metal alkoxide-based compound can react rapidly with water, the sol-gel reaction is carried out by diluting the metal alkoxide-based compound in an organic solvent and then slowly dripping water thereto.

In this case, it is preferable that the molar ratio (based on metal ions) of the metal alkoxide compound to water is adjusted within the range of 3 to 170, in consideration of the reaction efficiency and the like.

Here, the metal alkoxide-based compound may be at least one compound selected from the group consisting of titanium tetra-isopropoxide, zirconium isopropoxide, and aluminum isopropoxide.

On the other hand, the antireflection film may further include a substrate bonded to the other surface of the hard coating layer.

The substrate may be a transparent film having light transmittance of 90% or more and haze of 1% or less.

The material of the substrate may be a triacetyl cellulose, a cycloolefin polymer, a polyacrylate, a polycarbonate, a polyethylene terephthalate, or the like.

In addition, the thickness of the substrate film may be 10 to 300 µm in consideration of productivity and the like.

However, the present invention is not limited thereto

Advantageous Effects

According to the present invention, a photopolymerizable coating composition capable of providing a low refractive index layer realizing high alkali resistance and scratch resistance at the same time while having low reflectance and high light transmittance, a low refractive index layer obtained from the photopolymerizable coating composition, and an antireflection film capable of exhibiting excellent mechanical properties while enhancing screen sharpness of a display device, can be provided.

In the case of the low refractive index layer, because appearance characteristics such as reflectance and light transmittance or mechanical properties such as abrasion resistance and scratch resistance are not greatly reduced even when exposed to an alkali, the process of applying an additional protection film for protecting the outer surface can be omitted, and thus the production process can be simplified and production costs can be reduced.

DETAILED DESCRIPTION OF THE EMBODIMENTS

The present invention will be described in more detail by way of examples. However, the following examples are for illustrative purposes only and are not intended to limit the scope of the present invention thereto.

Preparation Example

Preparation Example 1: Preparation of Hard Coating Film 1 (HD1)

13 g of pentaerythritol triacrylate, 10 g of a urethane-based acryl oligomer (306I, KYOEISHA Chemical), 10 g of a urethane-based acryl oligomer (306T, KYOEISHA Chemical), 20 g of isopropyl alcohol, 2 g of a photoinitiator (Irgacure 184, Ciba), and 0.5 g of a leveling agent (BYK 300) were homogeneously mixed, and then 2.3 g of acrylic-styrene copolymer resin fine particles with a refractive index of 1.555 (Techpolymer, volume average particle size: 3 μm, manufacturer: Sekisui Plastic) and 0.01 g of a nano-silica dispersion liquid (volume average particle size: about 12 nm, Optisol-LSM, Lancosa) were added thereto to prepare a hard coating composition.

The hard coating composition thus obtained was coated onto a triacetyl cellulose film with a #10 Mayer bar, and dried at 90° C. for 1 minute.

Ultraviolet rays of 150 mJ/cm$^2$ were irradiated onto the dried product to prepare a hard coating film having a thickness of 6 μm.

Preparation Example 2: Preparation of Hard Coating Film 2 (HD2)

13 g of pentaerythritol triacrylate, 10 g of a urethane-based acryl oligomer (306I, KYOEISHA Chemical), 10 g of a photopolymerizable urethane-based acryl oligomer (MW 250,000, Daesung Chemical, 8BR-500), 20 g of isopropyl alcohol, 2 g of a photoinitiator (Irgacure 184, Ciba), and 0.5 g of a leveling agent (BYK 300) were homogeneously mixed, and then 1.3 g of acrylic-styrene copolymer resin fine particles with a refractive index of 1.555 (Techpolymer, volume average particle size: 2 μm, manufacturer: Sekisui Plastic), 1.3 g of acrylic-styrene copolymer resin fine particles with a refractive index of 1.525 (Techpolymer, volume average particle size: 2 μm, manufacturer: Sekisui Plastic), and 0.03 g of a nano-silica dispersion liquid (volume average particle size: about 12 nm, Optisol-LSM, Lancosa) were added thereto to prepare a hard coating composition.

The hard coating composition thus obtained was coated onto a triacetyl cellulose film with a #10 Mayer bar, and dried at 90° C. for 1 minute.

Ultraviolet rays of 150 mJ/cm$^2$ were irradiated onto the dried product to prepare a hard coating film having a thickness of 6 μm.

Preparation Example 3: Preparation of Hard Coating Film 3 (HD3)

13 g of pentaerythritol triacrylate, 10 g of a urethane-based acryl oligomer (306I, KYOEISHA Chemical), 10 g of a photopolymerizable urethane-based acryl oligomer (MW 250,000, Daesung Chemical, 8BR-500), 20 g of isopropyl alcohol, 2 g of a photoinitiator (Irgacure 184, Ciba), and 0.5 g of a leveling agent (BYK 300) were homogeneously mixed, and then 1.0 g of acrylic-styrene copolymer resin fine particles with a refractive index of 1.555 (Techpolymer, volume average particle size: 2 μm, manufacturer: Sekisui Plastic), 0.3 g of crosslinked styrene resin spherical particles with a refractive index of 1.60 (Techpolymer, volume average particle size: 3.5 μm, manufacturer: Sekisui Plastic), and 0.03 g of a nano-silica dispersion liquid (volume average particle size: about 100 nm, X24-9600 A, Shin-Etsu) were added thereto to prepare a hard coating composition.

The hard coating composition thus obtained was coated onto a triacetyl cellulose film with a #10 Mayer bar, and dried at 90° C. for 1 minute.

Ultraviolet rays of 150 mJ/cm$^2$ were irradiated onto the dried product to prepare a hard coating film having a thickness of 6 μm.

Preparation Example 4: Preparation of Hard Coating Film 4 (HD4)

30 g of pentaerythritol triacrylate, 2.5 g of a high molecular weight copolymer (BEAMSET 371, Arakawa Chemical Industries, Ltd., Epoxy Acrylate, molecular weight 40,000), 20 g of methyl ethyl ketone, 2 g of a photoinitiator (Irgacure 184, Ciba), and 0.5 g of a leveling agent (Tego wet 270) were homogeneously mixed, and then 2 g of acrylic-styrene copolymer resin fine particles with a refractive index of 1.544 (Techpolymer, volume average particle size: 2 μm, manufacturer: Sekisui Plastic) was added thereto to prepare a hard coating composition.

The hard coating composition thus obtained was coated onto a triacetyl cellulose film with a #10 Mayer bar, and dried at 90° C. for 1 minute.

Ultraviolet rays of 150 mJ/cm$^2$ were irradiated onto the dried product to prepare a hard coating film having a thickness of 6 μm.

Preparation Example 5: Preparation of Hard Coating Film 5 (HD5)

15 g of pentaerythritol triacrylate, 10 g of a urethane-based acryl oligomer (306I, KYOEISHA Chemical), 30 g of methyl ethyl ketone, 30 g of toluene, 2 g of a photoinitiator (Irgacure 184, Ciba), and 0.5 g of a leveling agent (Tego 410) were homogeneously mixed, and then 1 g of cross-linked styrene resin spherical particles with a refractive index of 1.59 (volume average particle size: 3.5 μm, SX series, Soken) and 1 g of acrylic-styrene copolymer resin fine particles with a refractive index of 1.525 (Techpolymer, volume average particle size: about 3 μm, manufacturer: Sekisui Plastic) were added thereto to prepare a hard coating composition.

The hard coating composition thus obtained was coated onto a triacetyl cellulose film with a #10 Mayer bar, and dried at 90° C. for 1 minute. Ultraviolet rays of 150 mJ/cm$^2$ were irradiated onto the dried product to prepare a hard coating film having a thickness of 6 μm.

Preparation Example 6: Preparation of Hard Coating Film 6 (HD6)

30 g of pentaerythritol triacrylate, 2.5 g of a high molecular weight copolymer (BEAMSET 371, Arakawa Chemical Industries, Ltd., Epoxy Acrylate, molecular weight 40,000), 2 g of a photoinitiator (Irgacure 184, Ciba), 20 g of methyl ethyl ketone, and 0.5 g of a leveling agent (Tego wet 270) were homogeneously mixed, and then 2 g of acrylic-styrene copolymer resin fine particles with a refractive index of 1.525 (volume average particle size: 2 μm, manufacturer: Sekisui Plastic) and 0.1 g of a nano-silica dispersion liquid (volume average particle size: 12 nm, Optisol-LSM, Lancosa) were added thereto to prepare a hard coating composition.

The hard coating composition thus obtained was coated onto a triacetyl cellulose film with a #10 Mayer bar, and dried at 90° C. for 1 minute.

Ultraviolet rays of 150 mJ/cm$^2$ were irradiated onto the dried product to prepare a hard coating film having a thickness of 4 μm.

Examples and Comparative Examples: Preparation of Antireflection Film (1) Preparation of a Photopolymerizable Coating Composition for Preparing a Low Reflective Index Layer The components shown in Table 1 below were mixed, and diluted in a solvent mixed with MIBK (methyl isobutyl ketone) and diacetone alcohol (DAA) at a weight ratio of 1:1 so that the solid content became 3% by weight.

TABLE 1

| (Unit: g) | LR1 | LR2 | LR3 | LR4 | LR5 |
|---|---|---|---|---|---|
| Hollow silica dispersion liquid | 220 (THRULYA 4320) | 30 (THRULYA 4320) | 20 (THRULYA 4320) | 30 (THRULYA 4320) | 6.7 (MIBK-SD) |
| rimethylolpropane triacrylate | 41 | 62 | 47 | 67 | 1 (1H,1H,6H,6H-perfluoro-1,6-hexanediol diacrylate) |
| olysilsesquioxane | 6 (MA0701) | (MA0701) | 0 | 0 | 4 (AC-SQ-F) |
| luorine-based compound containing photoreactive functional group RS907 | 13.33 | 6.667 | 13.333 | 6.667 | 0.1001 |
| Photoinitiator (Irgacure-127, Ciba) | 5 | 5 | 5 | 5 | 0.25 |

1) THRULYA 4320 (manufactured by Catalysts and Chemicals Ltd.): Hollow silica dispersion liquid (solid content of 20 wt % in MIBK solvent)

2) RS907 (manufactured by DIC): Fluorine-based compound containing a photoreactive functional group and containing a trace amount of silicon, diluted to a solid content of 30% by weight in MIBK solvent 3) MA0701: manufactured by Hybrid Plastics 4) AC-SQ-F: manufactured by Toagosei Co., Ltd. (silsesquioxane resin, functional group concentration 678 g/mol, inorganic fraction 15%, refractive index 1.39)

(2) Preparation of a Low Reflective Index Layer and an Antireflection Film

The photopolymerizable coating compositions each obtained from Table 1 were coated onto the hard coating films described in Table 2 below with a #3 Mayer bar, and dried at 60° C. for 1 minute.

Then, ultraviolet rays of 180 mJ/cm² were irradiated onto the dried product under a nitrogen purge to form a low refractive index layer having a thickness of 110 nm, thereby producing an antireflection film.

Experimental Example: Measurement of Physical Properties of Antireflection Film

For the antireflection films obtained in the examples and Comparative examples, experiments of the following items were carried out.

1. Alkaline Pretreatment

The antireflection films obtained in the examples and comparative examples were respectively immersed in an aqueous NaOH solution diluted to 10% with distilled water at 55° C. for 30 seconds, and washed by pouring water, followed by wiping off moisture.

2. Measurement of Average Reflectance and Color Coordinate Value (b*)

For the antireflection films obtained in the above examples and comparative examples, the back of the film was subjected to a darkening process before and after pretreatment, and then the average reflectance and the color coordinate value (b*) in a wavelength region from 380 nm to 780 nm were measured by applying a 100 T mode of Solidspec 3700 (SHIMADZU).

In the case of the color coordinate value (b*), the obtained average reflectance data was converted by a UV-2401PC program.

3. Measurement of Scratch Resistance

Before and after the pretreatment, the surfaces of the antireflection films obtained in the examples and comparative examples were rubbed while applying a load to steel wool (#0000) and reciprocating ten times at a speed of 27 rpm.

The scratch resistance was evaluated by confirming the maximum load at which a scratch of 1 cm or less observed with the naked eye was 1 or less.

4. Measurement of Surface Roughness

The 10-point average roughness of the shape of irregularities on the surface of the antireflection films each obtained in the examples and comparative examples was measured using a white-light interference 3D optical profiler (model name: NewView 7300, Zygo).

At this time, the area of 3.00*0.52 mm² was measured under the zoom measurement condition where the magnification of the lens used was 10 times (10×) and 1 time (1×).

Specifically, an antireflection film to be measured was placed on a sample stage in a flat state, images were obtained from an optical profiler, and the measurement was performed.

At this time, the measurement was performed by setting the lateral length to 3 mm, 2 to 3 line profiles were obtained from the obtained images, and 10-point average roughness was calculated.

5. Haze Measurement

For the antireflection films each obtained in the examples and comparative examples, the haze was measured at three places using HAZEMETER HM-150 equipment (manufactured by Murakami Color Research Laboratory) according to JIS K7105, and the average value was determined.

(1) Total haze (Ha): surface haze (Hs)+internal haze (Hi)
(2) The total haze is measured with respect to the haze of the antireflection film itself.
(3) The internal haze: A planarization layer was coated at 8 μm on the surface of the alkali-treated antireflection film, and haze of the entire film was measured.
(4) Alkali treatment: The antireflection films obtained in the examples and comparative examples were respectively immersed in an aqueous NaOH solution diluted to 10% with distilled water at 30° C. for 2 minutes, and washed by pouring water, followed by wiping off moisture. Then, they were dried in an oven at 50° C. for 1 minute.
(5) Planarization layer coating: Pentaerythritol triacrylate and Ebecryl 220 (oligomers of SK Cytec) were mixed in a weight ratio of 6:1, diluted in a 2:1 (weight ratio) mixed solvent of methyl ethyl ketone and toluene so that the solid content became 60 wt %, coated in a dry film thickness of 8 μm using a wire bar, dried, and cured, and then irregularities of the surface were planarized.

6. Sharpness Measurement

The sharpness of images was measured using ICM-1T from Suga Test Instruments.

The comparison of the sharpness was performed in combination with the sharpness value from a slit of 0.125 mm and sharpness value from slits of 0.125 mm, 0.5 mm, 1.0 mm, and 2.0 mm.

Further, it was confirmed that the antireflection film had total haze of 3% or less and internal haze of 2.7% or less, and the ratio of internal haze (Hi) to total haze (Ha) was 97% or less.

On the other hand, from the result of the sharpness, the image is clearer as the value from a narrow slit is higher. As a result of the sharpness measurement on the antireflection film, when the sharpness from slit 0.125 mm was 80% or more and the sum of the sharpness values excluding the 0.25 mm slit value was 350% or more, it could be applied to a high resolution display. As shown in Table 2, the antireflection films of the examples showed that the sharpness from the slit of 0.125 mm and the sum of the sharpness satisfied the above-mentioned range.

On the contrary, it was confirmed that the antireflection films of the comparative examples exhibited a relatively high variation in the color coordinate value or had low scratch resistance after alkali treatment.

In addition, it was confirmed that the antireflection film of the comparative examples exhibited relatively high total haze (Ha) and internal haze (Hi) values, and relative low sharpness from the slit of 0.125 mm, thus exhibiting relatively low light transmittance and poor optical properties.

The invention claimed is:

1. An antireflection film, comprising: a low refractive index layer and a hard coating layer,

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Low refractive index layer | LR1 | LR1 | LR1 | LR2 | LR1 | LR1 | LR3 | LR4 | LR5 |
| Hard coating layer | HD1 | HD2 | HD3 | HD3 | HD4 | HD5 | HD1 | HD3 | HD6 |
| Average reflectance (%) | 1.20 | 1.15 | 1.16 | 2.1 | 1.18 | 1.2 | 1.16 | 2.1 | 1.1 |
| Scratch resistance(g) | 350 | 350 | 350 | 600 | 350 | 350 | 150 | 500 | 300 |
| Total haze (Ha, %) | 2.678 | 2.514 | 2.721 | 2.707 | 3.124 | 10.028 | 2.667 | 2.719 | 3.138 |
| Internal haze (Hi, %) | 2.527 | 2.329 | 2.607 | 2.589 | 2.761 | 7.347 | 2.528 | 2.581 | 2.515 |
| Hi/Ha (%) | 94.36 | 92.64 | 95.81 | 95.64 | 88.38 | 73.265 | 94.788 | 94.925 | 80.146 |
| Variation in color coordinate value (b*) after alkali pretreatment | 0.34 | 0.41 | 0.38 | 0.3 | 0.28 | 0.4 | 0.9 | 1.08 | 1.3 |
| 10-point average roughness(Rz) | 0.141 | 0.127 | 0.167 | 0.171 | 0.473 | 1.121 | 0.146 | 0.168 | 0.632 |
| Sharpness (0.125 mm) | 91.6 | 90.9 | 92 | 91.2 | 74.1 | 64.8 | 92 | 90.9 | 71.2 |
| Sharpness (0.125 mm) | 376.9 | 374.7 | 380 | 377.8 | 326.1 | 303.1 | 377.9 | 378.3 | 322.7 |

As shown in Table 2 above, it was confirmed that the antireflection film of the examples exhibited relatively low average reflectance, and the variation in color coordinate after alkali treatment which was not very large, and furthermore, it had excellent scratch resistance as compared with the comparative examples.

Specifically, while the 10-point average roughness (Rz) of the shape of irregularities on the surface of the low refractive index layer included in the antireflection film was 0.05 μm to 0.2 μm, the antireflection film had a variation in color coordinate values (b*) after alkali pretreatment in the range of 0.25 to 0.45.

wherein the low refractive index layer includes a binder resin containing a crosslinked polymer of a photopolymerizable compound, a fluorine-based compound containing a photoreactive functional group and a polysilsesquioxane substituted with only one reactive functional group; and inorganic fine particles dispersed in e binder resin;

wherein a 10-point average roughness (Rz) of the shape of irregularities on the surface of the low refractive index layer is 0.05 μm to 0.2 μm, wherein the fluorine-based compound containing a photoreactive functional group has a fluorine content of 1% by weight to 25% by weight and a silicon content of 0.1% by weight to 20% by weight, and wherein the inorganic fine particles include at least one selected from the group consisting of solid inorganic nanoparticles having a diameter of 0.5 to 100 nm, and hollow inorganic nanoparticles having a diameter of 1 to 200 nm.

2. The antireflection film of claim 1, wherein the 10-point average roughness (Rz) of the shape of irregularities on the surface of the low refractive index is a result measured using a non-contact surface measuring system of a 3D optical profiler.

3. The antireflection film of claim 1, wherein a weight ratio of the portion derived from the polysilsesquioxane substituted with only one reactive functional group to the portion derived from the photopolymerizable compound in the binder resin contained in the low refractive index layer is 0.005 to 0.50.

4. The antireflection film of claim 1, wherein the reactive functional group substituted on the polysilsesquioxane is a functional group selected from the group consisting of an alcohol, an amine, a carboxylic acid, an epoxide, an imide, a (meth)acrylate, a nitrile, a. norbornene, an olefin, a polyethylene glycol, a thiol, and a vinyl group.

5. The antireflection film of claim 1, wherein the polysilsesquioxane substituted with only one reactive functional group includes a polyhedral oligomeric silsesquioxane having a cage structure.

6. The antireflection film of claim 5, wherein silicon atoms of the polyhedral oligomeric polysilsesquioxane are substituted with a reactive or unreactive functional group, and only one silicon atom of the polyhedral oligomeric polysilsesquioxane is substituted with the reactive functional group.

7. The antireflection film of claim 1, wherein the photopolymerizable compound includes a monomer or an oligomer containing a (meth)acrylate or vinyl group.

8. The antireflection film of claim 1, wherein the photoreactive functional group contained in the fluorine-based compound is at least one selected from the group consisting of a (meth)acrylate group, an epoxide group, a vinyl group, and a thiol group.

9. The antireflection film of claim 1, wherein the fluorine-based compound containing the photoreactive functional group includes at least one selected from the group consisting of: i) an aliphatic compound or an aliphatic cyclic compound in which at least one photoreactive functional group is substituted and at least one fluorine is substituted on at least one carbon; ii) a heteroaliphatic compound or a heteroaliphatic cyclic compound in which at least one photoreactive functional group is substituted, at least one hydrogen is substituted with fluorine, and at least one carbon is substituted with silicon; iii) a polydialkylsiloxane-based polymer in which at least one photoreactive functional group is substituted and at least one fluorine is substituted on at least one silicon; and iv) a polyether compound in which at least one photoreactive functional group is substituted and at least one hydrogen is substituted with fluorine.

10. The antireflection film of claim 1, wherein the fluorine-based compound containing the photoreactive functional group has a weight-average molecular weight of 2000 to 200,000.

11. The antireflection film of claim 1, wherein the low refractive index layer has a thickness of 1 nm to 200 nm, and the hard coating layer has a thickness of 0.1 μm to 100 μm.

12. The antireflection film of claim 1, wherein the hard coating film comprises a binder resin containing a photopolymerizable resin and organic or inorganic fine particles dispersed in the binder resin wherein the organic fine particles have a particle diameter of 1 to 10 μm, and the inorganic particles have a particle diameter of 1 nm to 500 nm.

13. The antireflection film of claim 12, wherein the binder resin of the hard coating layer further includes a high molecular weight (co)polymer having a weight average molecular weight of 10,000 or more.

14. The antireflection film of claim 1, wherein the antireflection film has average reflectance of 5% or less in a visible light wavelength band region of 380 nm to 780 nm, as measured at an incident angle of 8 degrees.

* * * * *